(12) United States Patent
Wiebe et al.

(10) Patent No.: US 7,293,697 B2
(45) Date of Patent: Nov. 13, 2007

(54) METHOD FOR MANAGING INFORMATION (75) Inventors: Linus Wiebe, Lund (SE); Christoffer Åkersten, Stockholm (SE); Mikael Jakobsson, Lund (SE); Jacob Andersen, Bromma (SE); Henrik Af Trampe, Lund (SE); Joachim Hollman, Stockholm (SE); Olof Wallquist, Stockholm (SE)

(73) Assignee: Anoto AB, Lund (SE)

( * ) Notice: Subject to any disclaimer, the term of this patent is extended or adjusted under 35 U.S.C. 154(b) by 0 days.

(21) Appl. No.: 10/516,518

(22) PCT Filed: May 30, 2003

(86) PCT No.: PCT/SE03/00886
§ 371 (c)(1),
(2), (4) Date: Apr. 14, 2005

(87) PCT Pub. No.: WO03/105064
PCT Pub. Date: Dec. 18, 2003

(65) Prior Publication Data
US 2005/0189407 A1   Sep. 1, 2005

Related U.S. Application Data (60) Provisional application No. 60/386,751, filed on Jun. 10, 2002.

(30) Foreign Application Priority Data
Jun. 5, 2002 (SE) .................................. 0201724

(51) Int. Cl.
G06F 17/00 (2006.01)
(52) U.S. Cl. ........................ 235/375; 178/19.01; 341/5
(58) Field of Classification Search ................ 235/375; 178/19.01; 341/5
See application file for complete search history.

(56) References Cited

U.S. PATENT DOCUMENTS 5,870,605 A    2/1999   Bracho et al.

FOREIGN PATENT DOCUMENTS

| JP | 06096383 A * | 4/1994 |
| WO | WO-99/50787 A1 | 10/1999 |
| WO | WO-00/73983 A1 | 12/2000 |
| WO | WO-01/26032 A1 | 4/2001 |
| WO | WO-01/48591 A1 | 7/2001 |

(Continued)

Primary Examiner—Michael G. Lee
Assistant Examiner—Kristy A. Haupt
(74) Attorney, Agent, or Firm—Birch, Stewart, Kolasch & Birch, LLP (57) ABSTRACT

The invention relates to a method of transferring data from a drawing device, which while utilizing a position-coding pattern, printed on a physical page, digitally records handwritten information, to an application in a computer system. The drawing device transfers recorded data to a memory in the computer system. A registering unit in the system determines from which part of the position-coding pattern the recorded data originates and activates, on the basis thereof, one or more applications which are registered as "subscribers" to data from this part of the pattern. When an application is activated and thus informed of the existence of new data relevant to the application, the application fetches this data. The fetching of data can be made on the basis of the contents of a page-describing file which defines the layout of the physical page.

34 Claims, 5 Drawing Sheets

FOREIGN PATENT DOCUMENTS

| WO | WO-01/48685 A1 | 7/2001 |
| WO | WO-01/75780 A1 | 10/2001 |
| WO | WO-02/39377 A1 | 5/2002 |
| WO | WO-01/48678 A1 | 7/2002 |

* cited by examiner

```
<pad>

<application_info name="service" value="anoto::note"/>
    <user_area top="14" left="9" name="drawing" width="55" height="75"/>
    <user_area top="91" left="19" name="text::To" width="24" height="3"/>
    <user_area top="95" left="23" name="text::Subject" width="22" height="3"/>
    <user_area top="7" left="30" name="service::Select word proc" width="2" height="2"/>
    <application_info name="service" value="anoto::word"/>
    </user_area>
    <user_area top="3" left="22" name="service::Select e-mail" width="2" height="2"/>
    <application_info name="service" value="anoto::e-mail"/>
    </user_area>
    <pidget top="101" left="59" id="0x200" name="Send" width="2" height="2"/>

</pad>
```

METHOD FOR MANAGING INFORMATION

CROSS REFERENCE TO RELATED APPLICATIONS

This application claims benefit from Swedish patent application no SE 0201724-2, filed Jun. 5, 2002, and U.S. provisional application No. U.S. 60/386751, filed Jun. 10, 2002.

FIELD OF THE INVENTION

The present invention relates to a method, in a computer system, of transferring information from a drawing device to an associated application.

BACKGROUND ART

The present invention is intended for use in connection with position-coding patterns. Such patterns have the property that if part of the pattern is detected optically, the position of this part in the total pattern can be determined unambiguously. Examples of such patterns are described in WO 01/26032, WO 00/73983 and WO 99/50787. Using such position-coding patterns, which can be called abstract, a very large area can be coded with good resolution. A very small subset of the total pattern is sufficient to position code, for instance, an A4 sheet.

As described in the above references, a digital pen can be provided with an optical detector which is capable of reading the pattern. If a user writes with the pen on a position-coded base, a sequence of positions can be recorded, which constitutes a digital copy of what has been written on the base.

This technique opens the possibility of letting a base, for instance in the form of a sheet of paper, constitute an interface for an application in a computer system communicating with the pen. By filling in preprinted, position-coded fields on the sheet of paper, the user can generate information which may then be utilized by an application in the computer system.

Many types of applications can in this way utilize the combination digital pen/position-coded base, for instance e-mail programs, word-processing programs, drawing programs etc.

The computer system then requires a function which distributes incoming position data to the right application.

A conceivable possibility of achieving this is to link certain sub areas or domains of the abstract position-coding pattern to certain applications. The computer system may then check which application is connected to the page (domain) in the abstract position-coding pattern utilized by the pen. The computer system then informs the pen which application is connected to data generated on the page, after which the pen sends the data to the right application in the computer system.

A problem associated with the approach above arises when several different software suppliers manufacture programs of the same type. Different sheets of paper are then necessary in order to be able to utilize an equivalent program/application from different suppliers and, vice versa, a number of different applications may be required to be able to utilize paper products from different suppliers. It is thus difficult to achieve anything but a one-to-one relation between a paper product and an application. As a rule, this makes it impossible for a user, who prefers a paper product from a first supplier and an application from a second supplier, to utilize such a product/application combination.

Furthermore most of the applications receiving position data from a pen/drawing device frequently refine (convert) this data to another format (for instance a graphical format such as .gif, .pdf, etc). It is not certain that other applications can utilize such formats. When a new application is installed, it will thus not have access to previously received information which can be relevant to the services implemented by the application since the information has already been transferred to other applications.

SUMMARY OF THE INVENTION

An object of the present invention is to wholly or partly eliminate the above problems.

According to a first aspect, the invention relates to a method, in a computer system, of transferring information from a drawing device, which is adapted to detect positions on a base by means of a position-coding pattern, which constitutes part of an abstract position-coding pattern, to an application in the computer system. The method is characterized by the steps of a) storing in a memory in the computer system position data coming from the drawing device; b) determining, based on the position of position data in the abstract position-coding pattern, which applications in the computer system are registered to utilize received data; and c) transferring said position data from the memory to said applications.

This provides a dynamic connection between pattern and application since a new application can be registered as "subscriber" to position data from a certain area in the abstract pattern. Furthermore, more than one application can easily read data from the memory, which makes it possible for a number of different applications from several different suppliers to simultaneously utilize information from one and the same paper product.

In one embodiment, the decision in step b) occurs on the basis of particulars in a register, comprising information about which applications utilize different parts of the position-coding pattern.

This enables implementation of a very simple system, for instance in the form of a look-up table.

Preferably, the decision in step b) occurs on the basis of the page identity of incoming data in the abstract position-coding pattern.

This provides a very simple process in the frequent cases where an entire page in the abstract position-coding pattern is dedicated for a physical page.

Preferably, the decision in step b) occurs on the basis of particulars in a page-describing file.

This enable selection of an application when the physical page is used. For example, a tick box can be marked with a cross to select the alternative "e-mail". By interpreting the position information on the basis of the contents of such a page-describing file, the system can determine that only applications suitable for managing e-mail are to be activated.

In a preferred embodiment, the page-describing file is associated with the position of incoming position data in the abstract position-coding pattern and comprises particulars about associated services, and the decision also occurs on the basis of particulars in a register, containing information about which applications are associated with different services.

This enables a very advantageous connection between position-coding pattern and application in two steps. A paper product can be registered in the system as associated with a certain service. An application can then be registered as an implementation of this service and gets access to the correct data, without knowing which part of the abstract position-coding pattern is printed on the paper product.

Preferably in step b), if an application has been found to be registered to utilize received data, the application is informed about the existence of new data in the memory, after which the application fetches position data from the memory. This alternative (referred to as "pull") gives the application the possibility of fetching data in a manner specific to the application, in contrast to a "push" procedure where the current data is sent to the application.

Preferably data is fetched on the basis of the contents of a page-describing file which contains information about the structure of the base relative to the received data. This makes it possible for the application to organize the data in a structured manner, without the application itself being aware of the appearance of the physical page.

According to a second aspect, the invention relates to a computer program for transferring, in a computer system, information from a drawing device, which is adapted to detect positions in a position-coding pattern, to an application in the computer system. The program contains instructions corresponding to the steps of a) storing in a memory in the computer system position data coming from the drawing device; b) determining, based on the position of position data in the position-coding pattern, which applications in the computer system are registered to utilize received data; and c) transferring said position data from the memory to said applications.

According to a third aspect, the invention relates to a digital storage medium comprising such a computer program. The computer program and the storage medium involve advantages corresponding to those of the method and may be varied similarly.

According to a fourth aspect, the invention relates to a method of registering an application in a computer system, the application being adapted to receive, in the computer system, position data which is generated when a drawing device is passed over part of an abstract position-coding pattern, which part is printed on a base. The method is characterized by registering the application as associated with at least one service, part of the abstract position-coding pattern being registered in the computer system as associated with the service.

This enables registering of an application as receiver of data associated with a certain service, without being aware of which parts of an abstract position-coding pattern are printed on a physical page which is adapted to be used in connection with the service.

In a preferred embodiment, the application is registered as associated with a basic service and with an additional service, the additional service at least comprising all the functionality of the basic service.

This allows development of more complex paper products and corresponding applications, which are also allowed to support existing, simpler paper products.

According to a fifth aspect, the invention relates to a computer program for registering an application in a computer system, the application being adapted to receive in the computer system position data which is generated when a drawing device is passed over part of an abstract position-coding pattern, which part is printed on a base. The program has instructions corresponding to the step of registering the application as associated with at least one service, part of the abstract position-coding pattern being recorded in the computer system as associated with the service.

According to a sixth aspect, the invention relates to a digital storage medium comprising such a computer program.

The computer program according to the fifth aspect and the storage medium according to the sixth aspect involve advantages corresponding to those of the method according to the fourth aspect.

BRIEF DESCRIPTION OF THE DRAWINGS

FIG. 3b shows an example of layout of a physical page corresponding to the PAD file in FIG. 3a.

DESCRIPTION OF PREFERRED EMBODIMENTS

Figure 1:
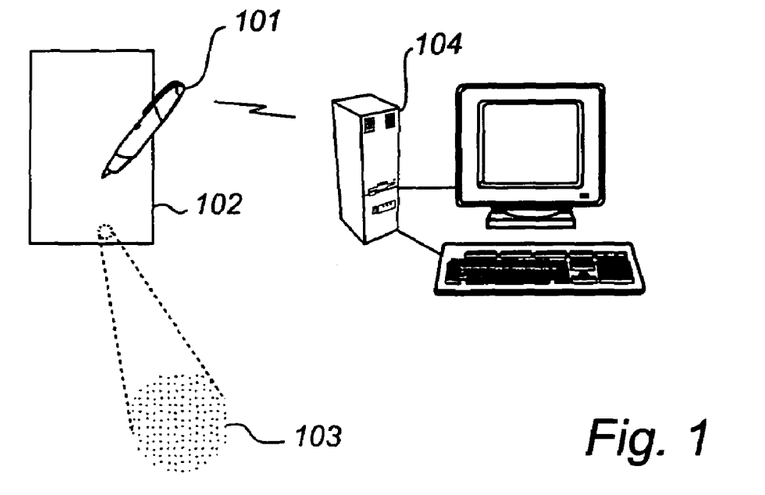
FIG. 1 illustrates a situation in which a method according to the present invention can be utilized.

FIG. 1 illustrates a situation in which a method according to the present invention can be utilized. A drawing device in the form of a digital pen 101 is used for writing on a sheet of paper 102 which is provided with a position-coding pattern 103 (enlarged). By a sensor in the pen optically recording the position-coding pattern and detecting the corresponding positions, a sequence of positions is generated in the pen 101 and constitutes a digital copy of what is being written on the sheet of paper 102. Other types of sensors than optical are conceivable in this context, such as magnetic, chemical, acoustic, electromagnetic, capacitive or inductive sensors.

The drawing device 101 communicates with a computer system 104 in the form of a personal computer (PC). The computer system may in addition to the PC comprise external components, such as a storage medium accessible for the PC via a computer network. Applications in the PC can use position data generated by the drawing device 101. For example a position-coded sheet of paper together with a digital pen may constitute an interface for an application, in which interface a user can fill in data to be utilized in the application and select functions to be performed by the application.

The position-coding pattern 103 on the sheet of paper 102 constitutes a small part of an abstract position-coding pattern. An abstract position-coding pattern can be formed as described in WO 01/26032, where a very large continuous, abstract position space can be defined by the pattern. This position-coding pattern may be referred to as a global position-coding pattern, and a small part of this pattern can be mapped (printed) on a physical page, for instance a sheet of paper.

Alternatively, the abstract position-coding pattern can be formed as disclosed in WO 99/50787, where a page space is defined and where a page from this page space can be printed with a pattern which codes positions with-in the page. The pattern that codes positions within a page is there the same for all pages.

By an abstract position-coding pattern is generally meant the position space which can be defined unambiguously by means of a position-coding process. Using the abstract position-coding pattern disclosed in WO 01/26032, for instance (if the entire pattern was printed) approximately $6 \cdot 10^7$ km$^2$ could be coded unambiguously with good resolution.

This abstract pattern can be logically divided into different segments. The segments are in turn divided into "shelves" which are divided into "books", each comprising a number of pages. The position of a certain page in the abstract pattern can therefore be noted as follows: segment-.shelf.book.page, for instance 231.841.334.226, about the same as an IP address. A certain position in this page can be noted 231.841.334.226:x=53421, y=63254. However, it is important to note that a position-coding pattern on a physical page need not conform with a page in the abstract position-coding pattern. This may also comprise patterns from several pages in the abstract pattern which need not even be neighboring pages. Thus it is possible to map separate parts of the abstract pattern on a physical paper page.

Figure 2:
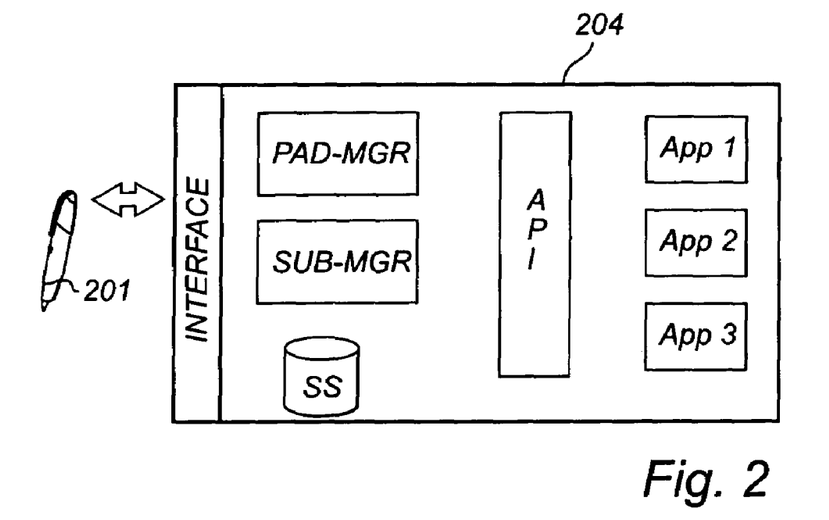
FIG. 2 illustrates logical components in a computer system which according to an embodiment of the invention cooperate with a drawing device in the form of digital pen.

FIG. 2 shows logical components in a computer system 204, which according to an embodiment of the invention cooperates with a drawing device in the form of a digital pen 201.

The system comprises an interface which enables communication, preferably in both directions, with the pen 201. The interface can be arranged for short range radio communication with the pen, for instance according to the BLUETOOTH standard. In addition to this, or instead of this, the interface can be arranged for communication with an IR link or a cable. Such a cable can be connected directly to the pen 201 or to a docking station, in which the pen can be docked for transferring information stored in the pen. If the computer system comprises a PC, use is preferably made of the USB port thereof for connecting the cable.

The system 204 further comprises a stroke memory (SS=stroke storage) for storing position data which corresponds to strokes made with the pen over a position-coded base. When position data from the pen is received by the interface of the computer system, this data is stored in the stroke memory. The stroke memory also comprises functionality which is adapted to extract information regarding to which part of the pattern stored position data belongs and to communicate such information to other units.

Furthermore the system comprises a registering unit (SUB-MGR=subscription manager). This comprises, or has access to, information regarding which parts of the abstract position-coding pattern different applications in the system may be expected to utilize. This information can be arranged as a look-up table, so that, if the input data is a position indication, output data in the form of a list is provided, including the applications that can be expected to utilize position data from the domain/domains in the abstract position-coding pattern to which the position indication belongs.

When information is transferred from the pen to the stroke memory, the registering unit checks in the first place from which page or pages in the abstract position-coding pattern the incoming position data comes. Then the application or applications is/are informed, which using a look-up table may be determined to be registered as "subscribers" to position information from this part of the abstract position-coding pattern, about the existence of new data. This provides a simple, dynamic connection between position-coding pattern and application. Preferably, however, a still more dynamic connection between pattern and application is utilized, in which the term service is introduced, as will be described below.

Preferably, the decision on which application or applications is/are involved is made on the basis of particulars in a page-describing file. This enables selection of an application when the physical page is used. For instance, a tick box can be marked with a cross to select the alternative "e-mail". By interpreting the position information on the basis of the contents of such a page-describing file, which will be described below, the system can determine that only applications suitable for managing e-mail are to be activated.

These applications App1, App2, App3 may then, via an API (Application Program Interface), fetch the current data from the stroke memory and utilize this data.

The computer system comprises, as indicated above, preferably also a set of page-describing files (PAD), which each contain information about the layout of a physical page which is connected to one or more services, such as e-mail services, calendar services etc. A service generally means a paper product having a layout which makes it possible for a user to perform certain activities (for instance write an e-mail). An application in a computer system may be said to implement this service (for instance send the e-mail). By layout is meant entry field and background image on a physical page, but usually not the position-coding pattern.

Services may be divided into single-application services and multiple-application services. Single-application services relate to actions intended predominantly to be carried out only once, such as sending a specific e-mail, these services are therefore associated with only one application. Multiple-application services relate to actions intended to be carried out on a regular basis, such as displaying the contents of a notebook, performing handwriting recognition or converting stroke data to images. A service may therefore be registered in the computer as a single-application or a multiple-application service, in order to allow the computer system to act accordingly.

Figure 3A:
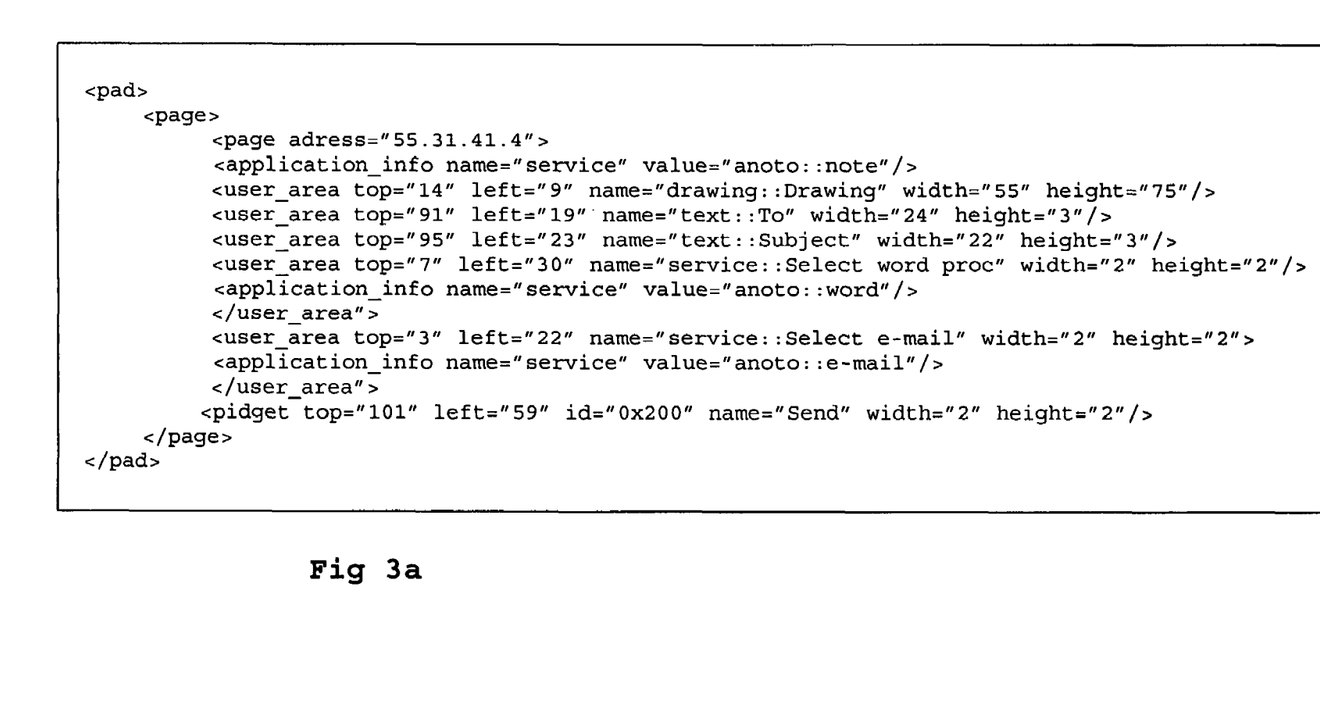
FIG. 3a illustrates an example of a PAD file.
Figure 3B:
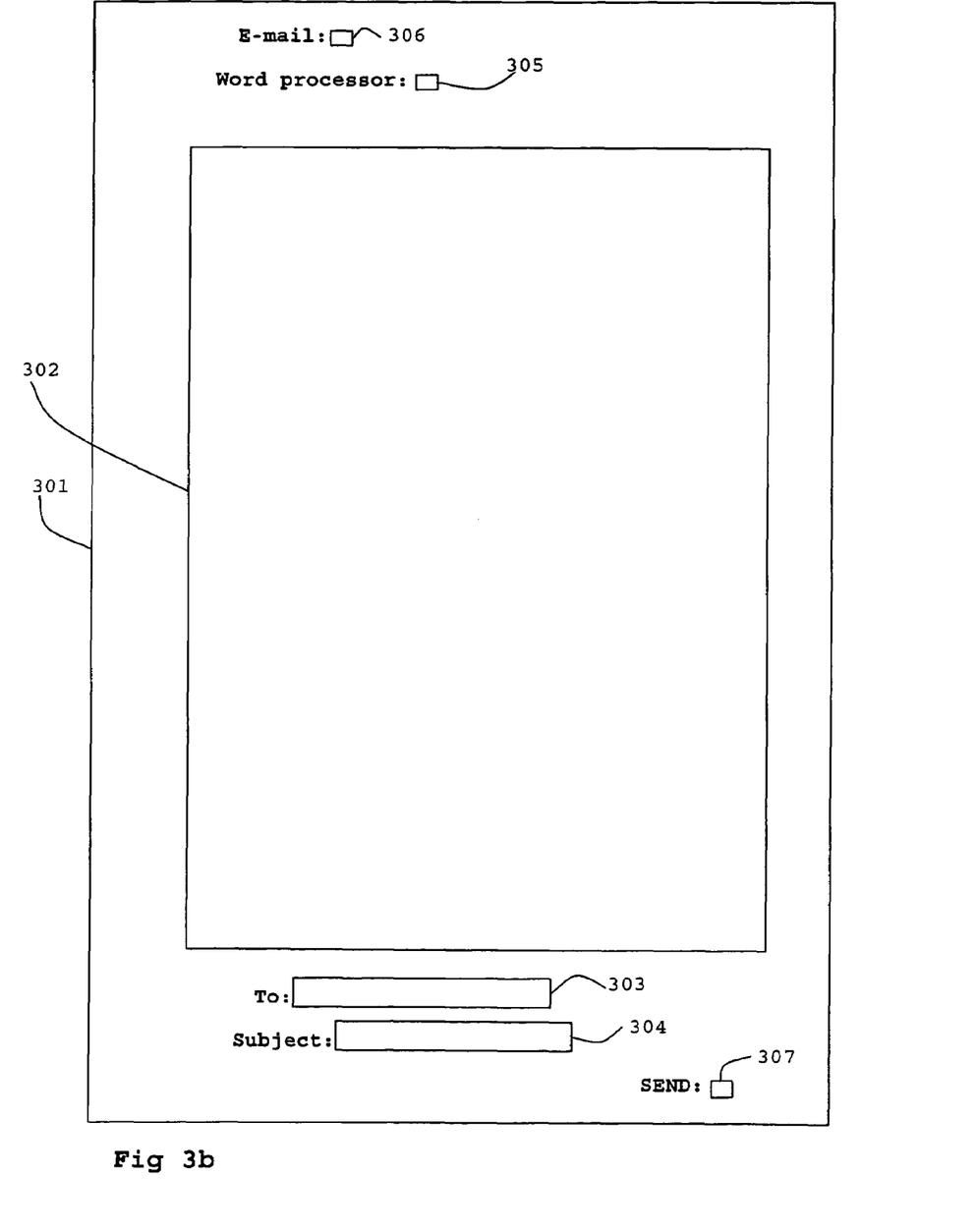

An example of the contents in the form of a code in a PAD file (PAD=Page Application Definition, page-describing file) and a corresponding physical page are shown in FIGS. 3a and 3b respectively. A PAD file in a computer readable format may conveniently be enclosed when buying a paper product. The PAD file is installed by means of a PAD Manager (PAD-MGR), which can also be used to supply data from the PAD files on request. It goes without saying that both PAD-MGR and SUB-MGR can be soft-ware implemented.

As stated in the PAD file in FIG. 3a, the position-coding pattern printed on the physical page 301 (FIG. 3b) here corresponds to a page in the abstract position-coding pattern (page address="55.31.41.4"). Also a service is indicated, for which the page is, or may be, intended (application_info name="service" value="anoto::note"), i.e. a "note service". Moreover a definition is made in the following order: size and location of a drawing area 302. Size and location of two text entry fields ("To:" and "Subject:" respectively) 303, 304, and size and location of two tick boxes are indicated, by means of which the user may select to use the page together with one of two services ("word processor" or "e-mail") 305, 306. Finally, size and location of an activation icon (pidget) 307 is defined, which is intended to activate a send function of the pen. The pen may thus have some knowledge of properties of different parts of the position-coding pattern. If a stroke is made with the pen through a send icon, positions are detected which make the pen set a send flag. If the pen communicates with a PC, transfer of information from the page to the PC is initiated; if not, this will be carried out as soon as communication with a PC is established.

By interpreting the information in the stroke memory based on the information in the PAD file, an application can thus interpret information from a position-coded page, which has a layout unknown to the application. For example, the application may establish that inputted "subject" text is to be found in a 22×3 "units" area in the position "95,23" in page 55.31.41.4. As indicated, the PAD file also provides information regarding which application or service in a group of applications or services is to be utilized, for instance word-processing functionality or e-mail functionality in a program package.

Figure 4:
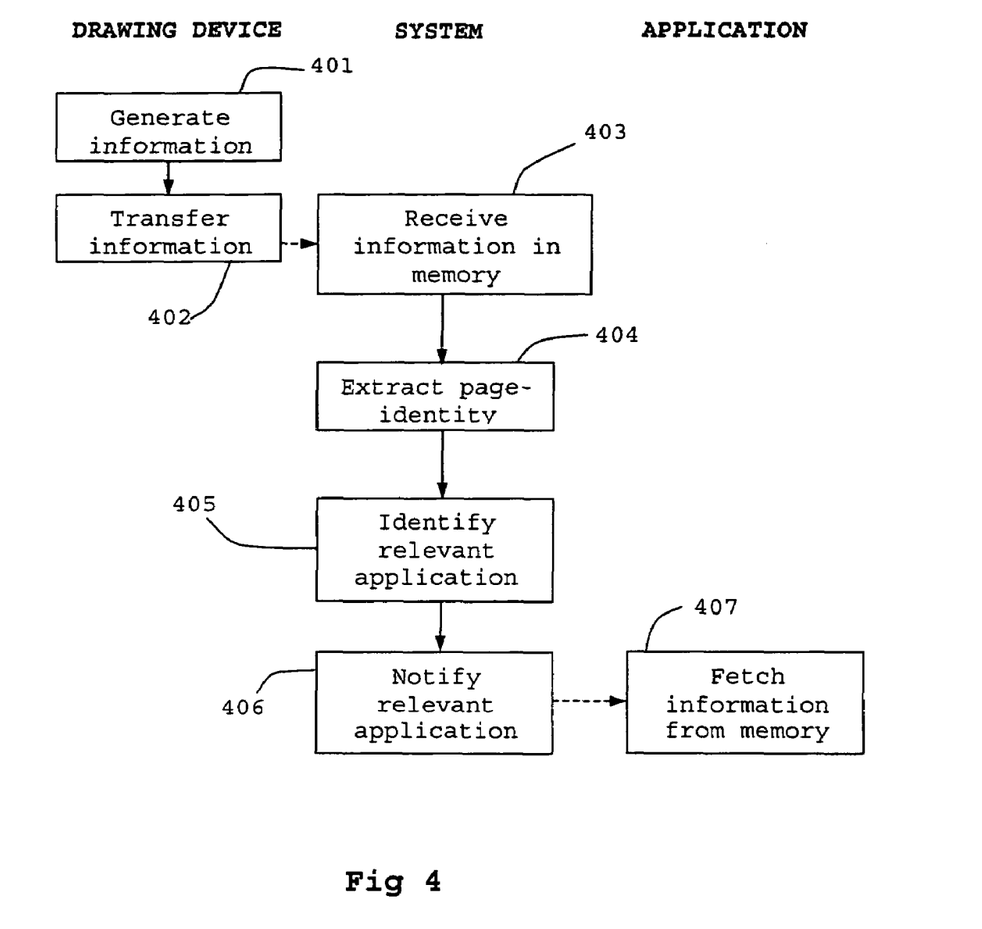
FIG. 4 is a flow chart of an embodiment of a method according to the invention.

When the method according to the present invention is utilized in a computer system, the following functions are performed in the drawing device, centrally in the computer system, and in an application in the computer system, which functions will be described with reference to FIG. 4.

Functionality in Drawing Device

As mentioned above, the drawing device, below referred to as pen, can be used offline, i.e. without continuous contact with an application in a computer system. Information generated 401 when the pen is used is then stored in the memory of the pen. Once communication has been established between the pen and a computer system, for instance by connecting the pen to a docking unit, a central function in the computer system is informed that docking has taken place.

Preferably information stored in the pen is then transferred 402 as follows. The computer system informs the pen of a program identity which corresponds to the stroke memory. This is done so that the mode of function of the pen does not have to be different from the cases when the pen in a more primitive process cooperates with computer systems which have no stroke memory and instead sends its information directly to an application.

Then the pen sends a request to the stroke memory, which request contains all the information stored in the memory of the pen. This, too, takes place by analogy with the above-mentioned more primitive process where the pen sends data and a request for processing of this data directly to an application.

Subsequently the pen receives an acknowledgement from the function in the stroke memory which communicates with other units.

Of course this process can be simplified so that transfer of information from the memory of the pen to the stroke memory takes place directly, without program identity and request being transferred.

Central Function in Computer System

The stroke memory receives and stores 403 incoming data. It should be emphasized that the stroke memory can be a computer storage function which in its entirety is positioned in the computer system/PC, or is wholly or partly relocated to one or more additional computer system components, for instance a web server. In any case the memory is located at the computer system's side of the interface between the computer system and the drawing device.

The stroke memory further extracts 404 the page identity of incoming data, thus to which page/pages in the abstract position-coding pattern the incoming data belongs. The page identity is transferred to a register unit (Subscription Manager).

Based on position data, preferably the page identity, the register unit should identify 405 the applications that can be intended to utilize incoming data and transfer 406 an event message to these applications, i.e. indicate that new data is available, thus allowing the application to fetch 407 the data. This identification function can be performed in various ways.

In one embodiment the registering unit is designed as a look-up table where, if the input data is a page identity, the output data is the identity of one or more applications. This provides a dynamic connection between position-coded paper and application. A paper can be used for a number of different applications and one application may utilize papers from quite different parts of the abstract position-coding pattern. The result of this approach is improved flexibility compared with a method where a one-to-one relation prevails between page and application, since the registering unit can be re-programmed when, for instance, a new and more advantageous application is installed. However it may be convenient to keep the possibility of utilizing one-to-one relations between position(page) and application. For instance, it may be technically advantageous to reserve certain parts of the abstract position-coding pattern for certain, particularly sensitive applications. The registering unit should then not allow other applications to be registered as "subscribers" to position information from these parts of the pattern.

In a preferred alternative embodiment, the connection between page and application takes place via one more step, viz. page→service→application. Then the PAD files described above can be utilized.

As mentioned above, a PAD file is connected to one or more pages in the abstract position-coding pattern. A PAD file used according to this embodiment of the invention contains, in addition to a description of the contents of the page, also a definition of which services the page contains. By service is meant, for instance, e-mail function, word-processing function, calculation function etc.

The registering unit in the computer system then contains, instead of or in addition to the connection page-application, a connection between service and application.

When the registering unit receives a page identity, the PAD file or PAD files corresponding to the page is/are found. It is checked which services are indicated in these files, after which applications, which in the registering unit are registered as implementations of these services, are activated and informed of the existence of new data. This makes it possible to write an application for performing a certain service completely without being aware of which pages in the abstract position-coding pattern are utilized for the service. When the application is installed in the computer system, it is indicated in the registering unit to which services the application "subscribes".

The utilization of the term service also makes it possible to implement services at several different complexity levels. For instance, a basic service "anoto::mail" is conceivable, which gives a simple e-mail interface with fields for message, recipient and subject. Both paper products and implementing applications may then be developed for the service. A supplier may then develop a more complex additional service (paper product) with the corresponding application "extra::mail", which in addition to the fields above makes it possible for the user to select a priority level (high/low) for a message. A corresponding PAD file is installed in the computer system. The more complex application can then be registered as subscriber both to "anoto::mail" and "extra::mail" and thus manages to create both simpler and more complex messages. The PAD file of the more complex paper product may contain references to both services, whereby the paper product may also be used together with simpler applications. However, there is preferably in the PAD file a priority order so that if possible an "extra::mail" application is selected to be able to utilize all the functionality in the paper product.

Figure 5A:
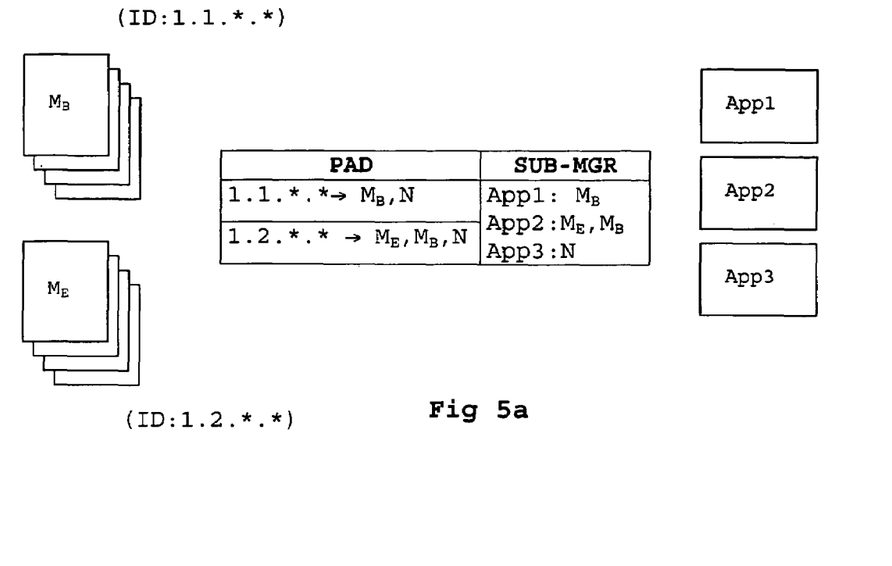
FIGS. 5a and 5b show schematically how connections between two different paper products and three different applications can be organized.
Figure 5B:
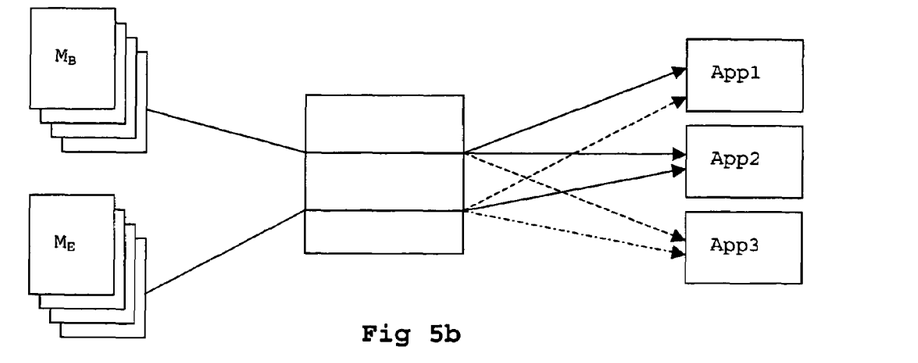

FIGS. 5a and 5b show schematically how connections between two different products $M_B$, $M_E$ and three different applications can be organized. $M_B$ (Mail-Basic) in FIG. 5a is a paper product which realizes a basic service. A position-coding pattern from segment No. 1 and shelf No. 1 (1.1.*.*) in an abstract position-coding pattern is printed on the product. A PAD file for this part of the pattern is installed in a computer system. This PAD file contains a connection between the pattern part and the service $M_B$. As a reserve alternative there is also a connection to a simple note service N (Notes), which merely reproduces information inputted with the paper product. The services are in the PAD file listed in descending order of priority so that in the first place $M_B$ is selected.

The product $M_E$ (Mail-Extra) realizes an additional service which comprises all the functionality of the basic service and also additional functionality. This product utilizes a position-coding pattern from segment No. 1 and shelf No. 2 (1.2.*.*) in the abstract position-coding pattern. Also this part of the pattern has a corresponding PAD file where $M_E$, $M_B$ and N are listed in descending order or priority.

The applications App1, App2 and App3 are registered in the SUB-MGR in the system. According to an embodiment, the invention relates to a method of registering an application in a computer system, where the application is adapted to receive position data which is generated when a drawing device is passed over part of an abstract position-coding pattern, which part is printed on a base. The application is registered as associated with at least one service, part of the abstract position-coding pattern being recorded in the computer system as associated with the service. Thus the application App1 is registered as "subscriber" to the service $M_B$, App2 is registered as "subscriber" to the service $M_E$ and the service $M_B$, and the application App3 is registered as "subscriber" to the service N. App1 and App2 are thus e-mail applications and App3 is a note application.

The effect of the registrations above are evident from FIG. 5b. The rectangle in the center of FIG. 5b illustrates the functions in the computer system which distribute incoming data by activating applications so that they read data in a stroke memory. If the computer system receives information from the product $M_B$, such information is in the first place transferred (solid arrow) to the applications which are registered as associated with the service $M_B$, i.e. App1 and/or App2. In the second place, if App1 and App2 are not registered in the system, the information is transferred (broken arrow) to App3, which is registered as associated with the service N.

If the computer system receives information from the product $M_E$, such information is in the first place transferred (solid arrow) to the application which is registered as associated with the service $M_E$, i.e. App2, in the second place to App1 ($M_B$), and in the third place (dash-dotted arrow) to App3 (N).

The different configurations of the function of the registering unit can be utilized in parallel. The registering unit activates on the one hand applications which are registered as "subscribers" to a page and, on the other hand, applications which are registered as "subscribers" to a service which is defined in a PAD file belonging to the page in question. It is to be noted that the connection between position and service need not necessarily be available in the PAD files; to this end, a double look-up table can also be created, which in addition to the connection service-application also contains the connection position (for example page)-service.

When the registering unit indicates/activates an application, the page identity or page identities which has/have caused the activation is/are also attached. Conveniently the registering unit then informs the appropriate applications also of which service is intended.

FUNCTIONALITY OF APPLICATION IN COMPUTER SYSTEM

When an application in the computer system is informed 406 of the existence of new data, it sends a request for access to data to the stroke memory and thus fetches 407 the data. The request concerns the current page/pages and information that has arrived after the application last fetched data from the storage. A new application which is installed can, if desired, fetch from the storage all previously recorded information which in the stroke memory is stored in unrefined format.

Preferably the application extracts, as mentioned above, data via an API on the basis of the contents of a PAD file corresponding to the page.

Summing up, the invention relates to a method of transferring data from a drawing device, which while utilizing a position-coding pattern, printed on a physical page, digitally records handwritten information, to an application in a computer system. The drawing device transfers recorded data to a memory in the computer system. A registering unit in the system determines from which part of the position-coding pattern the recorded data originates, and activates, on the basis thereof, one or more applications which are registered as "sub-scribers" to data from this part of the pattern. When an application has been activated and thus informed of the existence of new data relevant to the application, the application fetches this data. The fetching of data can be carried out on the basis of the contents of a page-describing file which defines the layout of the physical page.

The invention claimed is:

1. A method, in a computer system, of transferring information from a drawing device, which is configured to detect position data on a base by means of a position-coding pattern, which constitutes part of an abstract position-coding pattern, to an application in the computer system, said method comprising:
   storing in a memory in the computer system position data coming from the drawing device;
   extracting from said position data a page identifier identifying to which page or pages in the abstract position-coding pattern the position data belongs;
   determining, based on a location of said position data in the abstract position-coding pattern or the page identifier, which applications in the computer system are registered to utilize received data; and
   transferring said position data from the memory to at least one of said applications.

2. A method as claimed in claim 1, wherein said determining occurs on the basis of particulars in a register which comprises information about which applications utilize different parts of the position-coding pattern.

3. A method as claimed in claim 1, wherein said determining occurs on the basis of particulars in a page-describing file.

4. A method as claimed in claim 3, wherein the page-describing file corresponds to the location of incoming position data in the abstract position-coding pattern and comprises particulars about associated services, and wherein said determining also occurs on the basis of particulars in a register, containing information about which applications are associated with different services.

5. A method, in a computer system, of transferring information from a drawing device, which is configured to detect position data on a base by means of a position-coding pattern, which constitutes part of an abstract position-coding pattern, to an application in the computer system, said method comprising:

storing in a memory in the computer system position data coming from the drawing device;

determining, based on a location of said position data in the abstract position-coding pattern, which applications in the computer system are registered to utilize received data; and transferring said position data from the memory to at least one of said applications, wherein, in said determining, if an application is found to be registered to utilize received data, the application is informed about the existence of new position data in the memory.

6. A method as claimed in claim 5, wherein, in said transferring, the application fetches said position data from the memory.

7. A method as claimed in claim 6, wherein said position data is fetched on the basis of the contents of a page-describing file which contains information about the structure of the base relative to the received data.

8. A digital storage medium comprising a computer program for transferring, in a computer system, information from a drawing device, which is adapted to detect position data in a position-coding pattern, to an application in the computer system, said computer program comprising instructions corresponding to:

storing in a memory in the computer system position data coming from the drawing device;

extracting from said position data a page identifier identifying to which page or pages in the abstract position-coding pattern the position data belongs;

determining, based on a location of said position data in the position-coding pattern or said page identifier, which applications in the computer system are registered to utilize received data; and transferring said position data from the memory to at least one of said applications.

9. A device for transferring, in a computer system, information from a drawing device, which is configured to detect position data in a position-coding pattern, to an application in the computer system, said device comprising:

a storage handler which stores in a memory in the computer system position data coming from the drawing device and extracts from said position data a page identifier identifying to which page or pages in the position-coding pattern the position data belongs;

a registration handler which determines, based on a location of said position data in the position-coding pattern or the page identifier, which applications in the computer system are registered to utilize received data; and a transfer handler which enables transfer of said position data from the memory to said applications.

10. A device as claimed in claim 9, wherein said registration handler determines which applications in the computer system are registered to utilize received data, on the basis of particulars in a register which comprises information about which applications utilize different parts of the position-coding pattern.

11. A device as claimed in claim 9, wherein said registration handler determines which applications in the computer system are registered to utilize received data, on the basis of particulars in a page-describing file.

12. A device as claimed in claim 11, wherein the page-describing file corresponds to the location of incoming position data in the abstract position-coding pattern and comprises particulars about associated services, and wherein said registration handler also determines which applications in the computer system are registered to utilize received data on the basis of particulars in a register, containing information about which applications are associated with different services.

13. A device as claimed in claim 9, wherein, if an application is found to be registered to utilize received data, said registration handler informs the application about the existence of new position data in the memory.

14. A device as claimed in claim 13, wherein said transfer handler provides for the application to fetch said position data from the memory.

15. A device as claimed in claim 14, wherein said drawing device is configured to detect said positions from a base provided with said position-coding pattern, wherein said position data is fetched on the basis of the contents of a page-describing file which contains information about the structure of the base relative to the received data.

16. A method, in a computer system, of identifying an application in the computer system to receive information from a drawing device which is configured to detect position data in a position-coding pattern, said method comprising:

receiving incoming position data from the drawing device;

deriving, based upon said incoming position data, a service identifier; and identifying, based upon said service identifier, at least one application in the computer system, wherein said service identifier identifies an activity a user wishes to perform.

17. A method as claimed in claim 16, wherein said position-coding pattern is a subset of an abstract position-coding pattern, said deriving comprises deriving said service identifier based upon a location of said incoming position data in the abstract position-coding pattern.

18. A method as claimed in claim 17, wherein said deriving of the service identifier occurs on the basis of particulars in a page-describing file, which corresponds to the location of said incoming position data in the abstract position-coding pattern and comprises said service identifier.

19. A method as claimed in claim 18, wherein the page-describing file as such is associated with said service identifier.

20. A method as claimed in claim 18, wherein the page-describing file corresponds to said subset of the abstract position-coding pattern, said subset as a whole being associated with said service identifier.

21. A method as claimed in claim 18, wherein the page-describing file corresponds to said subset of the abstract position-coding pattern, a specific part of said subset being associated with said service identifier.

22. A method as claimed in claim 16, wherein said deriving of the service identifier occurs on the basis of particulars in a page-describing file.

23. A method as claimed in claim 16, wherein said deriving occurs on the basis of particulars in a register, which associates said position data with said at least one service identifier.

24. A method as claimed in claim 16, wherein said identifying occurs on the basis of particulars in a register, which associates said service identifier with said at least one application.

25. A digital storage medium comprising a computer executable program for identifying, in a computer system, an application in the computer system to receive information from a drawing device which is configured to detect position data in a position-coding pattern, said computer program comprising instructions corresponding to:
- receiving incoming position data from the drawing device;
- deriving, based upon said incoming position data, a service identifier; and
- identifying, based upon said service identifier, at least one application in the computer system, wherein said service identifier identifies an activity a user wishes to perform.

26. A device for identifying, in a computer system, an application in the computer system to receive information from a drawing device which is configured to detect position data in a position-coding pattern, said device comprising:
- a receiver which receives incoming position data from the drawing device;
- a service handler which, based upon said incoming position data, derives a service identifier; and
- registration handler which, based upon said service identifier, identifies at least one application in the computer system, wherein said service identifier identifies an activity a user wishes to perform.

27. A device as claimed in claim 26, wherein said position-coding pattern is a subset of an abstract position-coding pattern, wherein said service handler derives said service identifier based upon a location of said incoming position data in the abstract position-coding pattern.

28. A device as claimed in claim 27, wherein said service handler derives the service identifier on the basis of particulars in a page-describing file, and wherein the page-describing file corresponds to the location of said incoming position data in the abstract position-coding pattern and comprises said service identifier.

29. A device as claimed in claim 28, wherein the page-describing file as such is associated with said service identifier.

30. A device as claimed in claim 28, wherein the page-describing file corresponds to said subset of the abstract position-coding pattern, said subset as a whole being associated with said service identifier.

31. A device as claimed in claim 28, wherein the page-describing file corresponds to said subset of the abstract position-coding pattern, a specific part of said subset being associated with said service identifier.

32. A device as claimed in claim 26, wherein said service handler derives the service identifier on the basis of particulars in a page-describing file.

33. A device as claimed in claim 26, wherein said service handler derives said service identifier on the basis of particulars in a register, which associates said position data with said at least one service identifier.

34. A device as claimed in claim 26, wherein said registration handler identifies said at least one application on the basis of particulars in a register, which associates said service identifier with said at least one application.

* * * * *